R. H. Gilbert,
Air Blast.

No. 99,876. Patented Feb. 15, 1870.

Witnesses
Henry J. Aretz
A. Moore

Inventor
Rufus H. Gilbert

United States Patent Office.

RUFUS H. GILBERT, OF WASHINGTON, DISTRICT OF COLUMBIA.

Letters Patent No. 99,876, dated February 15, 1870.

IMPROVEMENT IN BLOWING APPARATUS.

The Schedule referred to in these Letters Patent and making part of the same.

I, RUFUS H. GILBERT, of the city of Washington, District of Columbia, have invented certain Improvements in Blowers or Air Devices, whereby to exhaust or compress air.

My invention relates to that class of devices or blowers which operate by means of a piston moving in a cylinder; and It consists—

First, in an improved valve or valves for the admission of air into the cylinder, the said valves being pivoted centrally, and which, being operated automatically, open or close corresponding openings in the cylinder-heads, which openings may be greater or lesser in number, and of any required size.

Second, in operating said valves pivoted centrally from or near the periphery.

Third, in an arrangement of arms, levers and springs for automatically opening and closing the said valves.

Fourth, in an improved construction of piston whereby to diminish friction.

Figure 1:
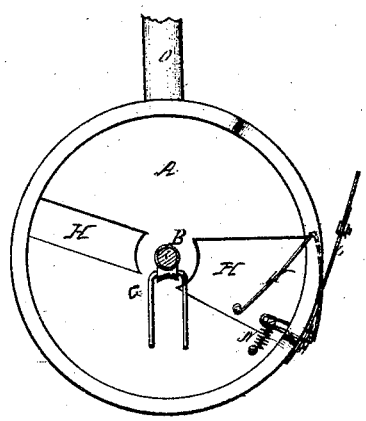
Figure 3:
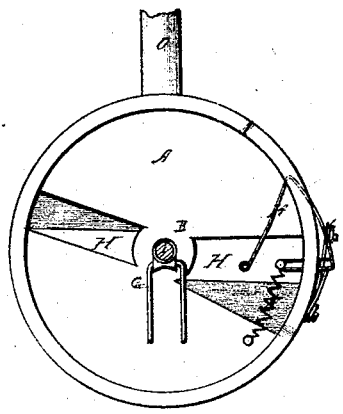
Figure 2:
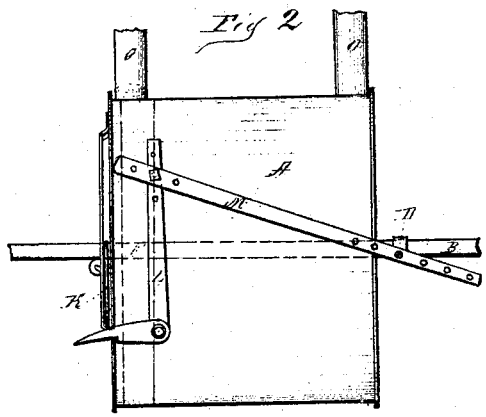
Figure 4:
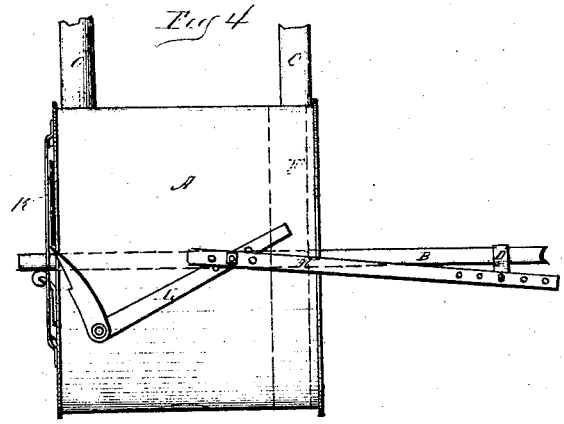

Figure 3 is a side elevation, with valve H closed.
Figure 4 is a side elevation, with valve H open.
Figure 1 is an end elevation, with valve H closed.
Figure 2 is an end elevation, with valve open.

A, fig. 1, is a cylinder, which may be of any suitable material or size, through which moves piston-rod B, carrying the piston-head hereinafter to be described.

In the head of the cylinder are valves, of which (being the same in form and arrangement) only one is shown. This valve moves on a collar attached to the cylinder-heads, and has a circular reciprocating movement around its central pivot. There is also attached at the centre a friction-roller, as clearly shown. The valves may be of greater or lesser extent, as may be found desirable. When the cylinder is arranged horizontally the lifted end is made heavier than the opposite ends, in order that the ends may be closed by gravity. If they be placed vertically, an auxiliary spring, N, is applied to close the valve, or it may be used to assist in closing the valve when the cylinder is placed horizontally.

Attached to the lifted end of the valve is a spring-catch, K, constructed and arranged to operate automatically with the lifting mechanism hereinafter to be described. This spring-catch is attached or pivoted at one end, and bent as shown in figs. 3 and 4, and with the other end bent to form a slot, through which passes a pin attaching it (K) to the valve H, but permitting motion in and out.

Instead of this spring, it is obvious that a triangular piece of any suitable material may be so pivoted as to swing in and out, in a manner similar to that in which the spring is thrown.

Located outside of the cylinder is a bell-crank, L, pivoted as shown, and having a connecting rod, M, fixed adjustably to the vertical arm. The bell-crank is so pivoted that the horizontal arm will pass the spring-catch, pressing it in, and then allow it to spring out again over the said arm. The connecting rod is attached in any suitable manner to the piston-rod.

The piston-head F is formed upon its periphery with grooves running around its entire circumference, to cause air packing.

The exit-pipe O is provided with a check-valve, to prevent the return of air, said pipe or opening being located near the head of the cylinder, allowing a recess equal to the thickness of valve, or more.

The operation of my improved devices is as follows:

The movement of piston B from the head cylinder A carries with it supporting arm D, which is connected by lever M to vertical arm of bell-crank L, causing its horizontal arm, under spring K, to raise valve H, which has a circular reciprocating movement, and which, during its movement, is in equilibrium of internal and external pressure, until the horizontal arm disengages the spring, and causes the heavy end of valve H to quickly descend by gravitation, aided, if in practice found necessary, by auxiliary spring N, thereby closing the valve at the proper moment of time. On the return movement of the piston-head F the air is forced out of the valve-opening O, near the end of the cylinder A. At the same time spring K, having been depressed by the downward movement of the horizontal arm of bell-crank L, is again liberated, so that the valve H, to which spring K is attached, will again be raised by the upward movement of the bell-crank connected by lever to arm D, and upon repetition of the action before described be again closed at the proper moment of time, the extent of the movement of the valve and the time of action being determined as may be required by the adjustable bell-crank and the connecting devices.

The check-valve shown in dotted line in exit-opening O prevents ingress of air, and G is a friction-roller located near holes in the cylinder-head, which holes may also be provided with stuffing-boxes, if necessary. The small amount of air retained in cylinder in the recess, equal to the thickness of the valve H inside the cylinder, and which is not expelled by the piston, serves to prevent, by its slight expansion, the valve H from binding, before the said valve has been acted upon by the receding piston, and serves momentarily to maintain equilibrium of internal and external atmospheric pressure.

The device may be kept from heating, from any cause, in any suitable way.

Having thus fully described the construction and operation of my improved blower,

What I claim, and desire to secure by Letters Patent of the United States, is—

1. In combination with the other parts of an atmospheric engine or blower, the valves H, at one or both ends, when centrally pivoted and moved as described.

2. The combination with said valve of an automatic agency for opening it to a point from which it shall close by gravity or by the tension of a spring, as set forth.

3. The spring-catch constructed and arranged to operate the valves, as set forth.

4. The auxiliary spring, spring-catch, and valves, as and for the purpose set forth.

5. The valve, when made with one side enlarged or weighted to act automatically by gravity, as set forth.

6. The bell-crank constructed and operating with the spring-catch and valves, as set forth.

7. The arrangement of the exit-pipe or openings in combination with the valves and connections, as and for the purpose set forth.

8. In combination with my improved blower, the friction-roller, as set forth.

9. In combination with the spring-catch, bell-crank, lever, and connecting rod, the arm D, operating as and for the purpose set forth.

RUFUS H. GILBERT.

Witnesses:
S. M. POOL,
A. MOORE.